US012447076B2

(12) United States Patent
Richter

(10) Patent No.: US 12,447,076 B2
(45) Date of Patent: Oct. 21, 2025

(54) MOTION-BASED POWER ASSIST SYSTEM FOR WHEELCHAIRS

(71) Applicant: Max Mobility, LLC, Lebanon, TN (US)

(72) Inventor: W. Mark Richter, Nashville, TN (US)

(73) Assignee: Max Mobility, LLC

( * ) Notice: Subject to any disclaimer, the term of this patent is extended or adjusted under 35 U.S.C. 154(b) by 168 days.

(21) Appl. No.: 18/506,706

(22) Filed: Nov. 10, 2023

(65) Prior Publication Data

US 2024/0074924 A1 Mar. 7, 2024

Related U.S. Application Data

(63) Continuation of application No. 17/342,104, filed on Jun. 8, 2021, now Pat. No. 11,813,209, which is a continuation of application No. 15/218,937, filed on Jul. 25, 2016, now Pat. No. 11,065,166, which is a continuation of application No. 13/543,598, filed on Jul. 6, 2012, now Pat. No. 9,398,990.

(60) Provisional application No. 61/504,949, filed on Jul. 6, 2011.

(51) Int. Cl.
*A61G 5/04* (2013.01)

(52) U.S. Cl.
CPC ............... *A61G 5/04* (2013.01); *A61G 5/045* (2013.01); *A61G 5/047* (2013.01); *A61G 5/048* (2016.11); *A61G 2203/12* (2013.01); *A61G 2203/30* (2013.01); *A61G 2203/36* (2013.01)

(58) Field of Classification Search
CPC .......... A61G 5/04; A61G 5/045; A61G 5/047; A61G 5/048; A61G 2203/30; A61G 2203/36
See application file for complete search history.

(56) References Cited

U.S. PATENT DOCUMENTS 2,448,992 A 9/1948 Love et al.
2,495,573 A * 1/1950 Duke .................. A61G 5/0825 180/65.6

(Continued)

FOREIGN PATENT DOCUMENTS

DE 300247 C 1/1917
DE 4323937 C1 7/1993

(Continued)

OTHER PUBLICATIONS

Int'l Search Report and Written Opinion for PCT/US2018/064935, mailed Mar. 1, 2019 (15 pages).

(Continued)

*Primary Examiner* — Jeffrey J Restifo
(74) *Attorney, Agent, or Firm* — MCANDREWS HELD & MALLOY, LTD

(57) ABSTRACT

A motion-based push activation power assist system for manual wheelchairs. The system uses motion-based measurements to determine when the user applies a push to the wheelchair handrims and brakes with the handrims. The push recognition activates a drive system that provides an assistive driving force-pulse to the wheelchair to reduce the demand on the user during propulsion. The brake recognition deactivates the power assist. The provided power assist is proportional to the sensed push and can be modulated to different proportional settings.

20 Claims, 5 Drawing Sheets

(56) References Cited

U.S. PATENT DOCUMENTS

| | | | | |
|---|---|---|---|---|
| 3,905,437 | A * | 9/1975 | Kaiho | A61G 5/047 180/65.6 |
| 4,207,959 | A | 6/1980 | Youdin et al. | |
| 4,260,035 | A | 4/1981 | Loveless et al. | |
| 4,386,672 | A * | 6/1983 | Coker | A61G 5/047 180/907 |
| 4,422,515 | A | 12/1983 | Loveless | |
| 4,652,026 | A | 3/1987 | Byrge | |
| 4,728,812 | A | 3/1988 | Sheriff et al. | |
| 4,759,418 | A * | 7/1988 | Goldenfeld | A61G 5/1054 180/907 |
| 4,767,940 | A | 8/1988 | Tuttle | |
| 4,770,431 | A | 9/1988 | Kulik | |
| 4,823,900 | A | 4/1989 | Farnam | |
| 4,926,952 | A | 5/1990 | Farnam | |
| 5,016,720 | A * | 5/1991 | Coker | A61G 5/0825 74/105 |
| 5,113,959 | A * | 5/1992 | Mastov | A61G 5/047 180/65.6 |
| 5,135,063 | A * | 8/1992 | Kropf | A61G 5/1051 180/907 |
| 5,222,567 | A * | 6/1993 | Broadhead | B60K 1/00 180/907 |
| 5,234,066 | A * | 8/1993 | Ahsing | A61G 5/0825 340/870.37 |
| 5,244,051 | A * | 9/1993 | Wu | A61G 5/1054 74/498 |
| 5,351,774 | A * | 10/1994 | Okamoto | F16F 1/22 267/229 |
| 5,366,037 | A * | 11/1994 | Richey | A61G 5/1054 180/65.6 |
| 5,494,126 | A * | 2/1996 | Meeker | A61G 5/047 180/907 |
| 5,555,949 | A * | 9/1996 | Stallard | B60L 50/60 180/907 |
| 5,651,422 | A * | 7/1997 | Casali | B62B 5/0026 180/907 |
| 5,818,189 | A * | 10/1998 | Uchiyama | A61G 5/1054 318/432 |
| 5,826,670 | A * | 10/1998 | Nan | A61G 5/1051 180/211 |
| 5,878,829 | A * | 3/1999 | Kanno | B60L 3/0046 180/907 |
| 5,927,414 | A * | 7/1999 | Kan | A61G 5/048 180/907 |
| 6,059,060 | A * | 5/2000 | Kanno | A61G 5/045 180/907 |
| 6,112,837 | A * | 9/2000 | Kanno | A61G 5/048 73/1.09 |
| 6,230,831 | B1 * | 5/2001 | Ogata | A61G 5/048 318/60 |
| 6,290,014 | B1 * | 9/2001 | MacCready, Jr. | B62M 7/16 180/205.1 |
| 6,302,226 | B1 * | 10/2001 | Kanno | B62M 6/45 180/907 |
| 6,334,497 | B2 | 1/2002 | Odell | |
| 6,354,390 | B1 * | 3/2002 | Uchiyama | A61G 5/1054 180/907 |
| 6,360,836 | B1 * | 3/2002 | Milano, Jr. | B62B 5/0046 280/47.38 |
| 6,416,063 | B1 | 7/2002 | Stillinger et al. | |
| 6,459,962 | B2 * | 10/2002 | Ulrich | B62D 51/04 701/1 |
| 6,481,514 | B2 * | 11/2002 | Takada | A61G 5/047 180/11 |
| 6,571,892 | B2 | 6/2003 | Kamen et al. | |
| 6,702,051 | B2 * | 3/2004 | Chu | A61G 7/0528 180/907 |
| 6,729,421 | B1 * | 5/2004 | Gluck | A61G 7/08 180/11 |
| 6,729,422 | B2 * | 5/2004 | Chu | A61G 5/1051 192/69.62 |
| 6,807,465 | B2 * | 10/2004 | Ulrich | B62D 51/04 701/1 |
| 6,842,692 | B2 | 1/2005 | Fehr et al. | |
| 6,860,347 | B2 * | 3/2005 | Sinclair | A61G 5/0825 180/11 |
| 6,880,661 | B1 * | 4/2005 | Oh | B62M 7/14 180/15 |
| 7,138,774 | B2 | 11/2006 | Negoro et al. | |
| 7,264,272 | B2 | 9/2007 | Mulhern et al. | |
| 7,311,160 | B2 | 12/2007 | Lim | |
| 7,383,107 | B2 | 6/2008 | Fehr et al. | |
| 7,383,904 | B2 * | 6/2008 | Wu | H02K 11/0094 180/907 |
| 7,404,465 | B2 | 7/2008 | Hsieh | |
| 7,425,007 | B2 | 9/2008 | Johannes de Kruijf | |
| 7,426,970 | B2 | 9/2008 | Olsen | |
| 7,566,102 | B2 | 7/2009 | Guile | |
| 7,581,604 | B2 | 9/2009 | Torita | |
| 7,648,156 | B2 | 1/2010 | Johanson | |
| 7,670,263 | B2 | 3/2010 | Ellis et al. | |
| 7,770,674 | B2 * | 8/2010 | Miles | A61G 5/045 477/44 |
| 7,832,515 | B2 * | 11/2010 | Barthelt | A61G 5/1051 180/65.6 |
| 7,837,210 | B2 | 11/2010 | Kylstra et al. | |
| 7,886,854 | B2 * | 2/2011 | Chiu | A61G 5/047 180/11 |
| 7,976,049 | B2 | 7/2011 | Chiu | |
| 8,038,165 | B2 | 10/2011 | Wang | |
| 8,127,875 | B2 | 3/2012 | Mattes et al. | |
| 8,181,992 | B2 | 5/2012 | Mulhern et al. | |
| 8,186,463 | B2 | 5/2012 | Hunziker et al. | |
| 8,261,867 | B1 * | 9/2012 | Gainer | A61G 5/047 903/952 |
| 8,292,010 | B2 | 10/2012 | Puskar-Pasewicz et al. | |
| 8,292,678 | B2 | 10/2012 | Burgess, Jr. | |
| 8,306,673 | B1 | 11/2012 | Manning | |
| 8,413,749 | B2 * | 4/2013 | Hsu | A61G 5/048 180/907 |
| 8,430,189 | B2 * | 4/2013 | Tallino | A61G 5/1054 180/11 |
| 8,556,279 | B2 | 10/2013 | McKinnon | |
| 8,602,138 | B2 * | 12/2013 | Filkoski | A61G 5/047 280/250 |
| 8,652,009 | B2 | 2/2014 | Ellis et al. | |
| 8,758,191 | B2 | 6/2014 | Takenaka et al. | |
| 9,144,525 | B2 * | 9/2015 | Richter | A61G 5/1005 |
| 9,398,990 | B2 * | 7/2016 | Richter | A61G 5/04 |
| 9,615,982 | B2 * | 4/2017 | Richter | B60B 19/003 |
| 9,795,524 | B2 * | 10/2017 | Richter | A61G 5/047 |
| 9,796,401 | B1 * | 10/2017 | Ammirati | B62B 5/005 |
| 10,167,051 | B1 * | 1/2019 | Richter | A61G 5/048 |
| 10,265,228 | B2 * | 4/2019 | Richter | A61G 5/048 |
| 10,322,043 | B2 * | 6/2019 | Richter | H02P 31/00 |
| 11,576,830 | B2 * | 2/2023 | Menig | A61G 5/047 |
| 11,642,256 | B2 * | 5/2023 | Menig | A61G 5/047 180/13 |
| 12,178,765 | B2 * | 12/2024 | Paltsev | A61G 5/047 |
| 2001/0022244 | A1 * | 9/2001 | Takada | A61G 5/047 180/69.6 |
| 2002/0019686 | A1 | 2/2002 | Nathan et al. | |
| 2002/0036105 | A1 | 3/2002 | Birmanns et al. | |
| 2002/0171559 | A1 | 11/2002 | Yang | |
| 2003/0089537 | A1 * | 5/2003 | Sinclair | A61G 5/047 180/65.1 |
| 2003/0127261 | A1 * | 7/2003 | Borroni-Bird | B60G 7/003 180/65.1 |
| 2003/0226698 | A1 | 12/2003 | Kamen et al. | |
| 2004/0251649 | A1 | 12/2004 | Wu | |
| 2005/0000742 | A1 | 1/2005 | Mulhern | |
| 2005/0077694 | A1 | 4/2005 | Levi | |
| 2005/0137652 | A1 | 6/2005 | Cauller | |
| 2005/0236208 | A1 | 10/2005 | Runkles | |
| 2006/0244249 | A1 | 11/2006 | Goertzen | |
| 2006/0255581 | A1 | 11/2006 | Goertzen | |
| 2007/0020985 | A1 | 1/2007 | Naitou | |
| 2007/0039766 | A1 | 2/2007 | Jackson | |
| 2007/0095580 | A1 | 5/2007 | Liao | |

(56) References Cited

U.S. PATENT DOCUMENTS

| | | | | |
|---|---|---|---|---|
| 2007/0095582 | A1 | 5/2007 | Stuijt | |
| 2007/0131730 | A1 | 6/2007 | Mirzale | |
| 2007/0145711 | A1 | 6/2007 | Mulhren | |
| 2007/0152427 | A1 | 7/2007 | Olsen | |
| 2007/0235234 | A1 | 10/2007 | De Kruijf | |
| 2007/0261897 | A1 | 11/2007 | Torita | |
| 2007/0283966 | A1 | 12/2007 | Maples | |
| 2008/0054596 | A1 | 3/2008 | Johanson | |
| 2008/0061627 | A1 | 3/2008 | Spector | |
| 2008/0066974 | A1* | 3/2008 | Pearlman | A61G 5/128 180/22 |
| 2008/0115982 | A1* | 5/2008 | Lin | A61G 5/1051 180/13 |
| 2008/0115987 | A1* | 5/2008 | Barthelt | A61G 5/045 180/65.6 |
| 2008/0300777 | A1 | 12/2008 | Fehr | |
| 2009/0050381 | A1 | 2/2009 | Cheng | |
| 2009/0194974 | A1 | 8/2009 | Smith | |
| 2010/0022908 | A1 | 1/2010 | Cauller | |
| 2010/0036543 | A1 | 2/2010 | Bitzer | |
| 2010/0300777 | A1 | 12/2010 | Tallino | |
| 2010/0301576 | A1 | 12/2010 | Dugas | |
| 2011/0199393 | A1 | 8/2011 | Nurse et al. | |
| 2011/0214929 | A1* | 9/2011 | Filkoski | A61G 5/047 180/65.1 |
| 2011/0304121 | A1* | 12/2011 | Chiu | A61G 5/047 280/304.1 |
| 2012/0012416 | A1 | 1/2012 | Mirzaie | |
| 2012/0068435 | A1 | 3/2012 | Birmanns | |
| 2012/0080243 | A1* | 4/2012 | Mulhern | A61G 5/047 180/11 |
| 2012/0138376 | A1 | 6/2012 | Zhou | |
| 2012/0143400 | A1 | 6/2012 | Minkel, III | |
| 2012/0144554 | A1 | 6/2012 | Thellmann | |
| 2012/0217081 | A1 | 8/2012 | Mulhern | |
| 2012/0217713 | A1 | 8/2012 | Mulnar | |
| 2013/0008732 | A1* | 1/2013 | Richter | A61G 5/048 180/11 |
| 2013/0080015 | A1 | 3/2013 | Strothmann | |
| 2013/0205501 | A1 | 8/2013 | Robertson et al. | |
| 2013/0218380 | A1 | 8/2013 | Phillips | |
| 2013/0240271 | A1* | 9/2013 | Tallino | A61G 5/1054 180/11 |
| 2013/0253769 | A1 | 9/2013 | Kamo | |
| 2014/0058582 | A1 | 2/2014 | Jaenke | |
| 2014/0262575 | A1* | 9/2014 | Richter | A61G 5/022 180/11 |
| 2015/0298765 | A1 | 10/2015 | Golden, Jr. | |
| 2015/0357948 | A1 | 12/2015 | Goldstein | |
| 2016/0242977 | A1* | 8/2016 | Richter | A61G 5/048 |
| 2017/0027785 | A1 | 2/2017 | Richter | |
| 2017/0347885 | A1 | 12/2017 | Tan et al. | |
| 2020/0085651 | A1* | 3/2020 | Menig | A61G 5/047 |
| 2021/0139098 | A1* | 5/2021 | Carrasco Vergara | B62K 11/02 |
| 2021/0338500 | A1* | 11/2021 | Richter | A61G 5/045 |
| 2023/0072204 | A1* | 3/2023 | Iacono | B60K 1/04 |
| 2023/0190546 | A1* | 6/2023 | Emfinger | A61G 5/047 180/11 |
| 2023/0190547 | A1* | 6/2023 | Emfinger | A61G 5/047 180/13 |
| 2023/0190548 | A1* | 6/2023 | Emfinger | A61G 5/1005 180/13 |
| 2024/0261161 | A1* | 8/2024 | Togashi | A61G 5/048 |

FOREIGN PATENT DOCUMENTS

| | | | |
|---|---|---|---|
| DE | 19539487 | A1 | 4/1997 |
| DE | 19748201 | C1 | 3/1999 |
| DE | 19857786 | A1 | 9/1999 |
| DE | 29907846 | U1 | 9/1999 |
| DE | 19848530 | C1 | 2/2000 |
| DE | 10046963 | C1 | 12/2001 |
| DE | 102007004704 | A1 | 8/2008 |
| EP | 1854443 | A2 | 11/2007 |
| EP | 3260101 | A1 | 12/2017 |
| EP | 3260101 | B1 | 7/2021 |
| GB | 2223994 | A | 4/1990 |
| GB | 2274265 | A | 7/1994 |
| GB | 2393162 | A | 3/2004 |
| JP | 06304205 | A | 11/1994 |
| JP | 09285501 | A | 11/1997 |
| JP | 2000084007 | A | 3/2000 |
| JP | 2003052760 | A | 2/2003 |
| JP | H10314234 | A | 12/2003 |
| JP | 2006081849 | A | 3/2006 |
| JP | 2009078044 | A | 4/2009 |
| KR | 20150089860 | A | 8/2015 |
| WO | 2005082083 | A2 | 9/2005 |
| WO | 2013006818 | A2 | 1/2013 |

OTHER PUBLICATIONS

Lutin. Smart Drive Power Assist Wheel DEMO. YouTube. Oct. 23, 2012. Retrieved from internet: <URL:http://www.youtube.com/watch?v=3RbaFns4iXQ>.

Sunrise Medical, WheelDrive manual, MD_WheelDrive_EU_DE_RevA_2016_11_17, 12 pages.

Sunrise Medical GmbH, GER, Model: Krypton, product sheet for EU Market, 2 pages.

Max Mobility, Installation guide for adapter axis, 2 pages.

E-Move, Decon product brochure, 10 pages.

Alber GmbH, Twion Brochure, 12 pages.

Alber GmbH, e-motion brochure, 8 pages.

Alber GmbH, e-fix, 8 pages.

DPX Systems Drill Powered Wheelchair, https://www.youtube.com/watch?v=eG9q6iHF_bl, 2007, retrieved on Jun. 3, 2021.

Sunrise Medical, WheelDrive, Brochure, 8 pages.

European Patent Office, Extended European Search Report, Application No. 17162833.2-1651, Dated: Oct. 27, 2017, 6 pages.

European Patent Office, Extended European Search Report, Application No. 12807785.6-1651, Dated: Jun. 10, 2015, 5 pages.

International Preliminary Report on Patentability , PCT/US2012/045816, Mailed Jan. 7, 2014, 6 pages.

Brian D. Mayton, WristQue: A Personal Sensor Wristband for Smart Infrastructure and Control, submitted to the Program in Media Arts and Sciences, School of Architecture and Planning on Oct. 9, 2012, 72 pages.

Daniel Petersson, Jonas Johanssen, Ulf Holmberg and Bjorn Astrand, Torque Sensor Free Power Assisted Wheelchair, Proceedings of the 2007 IEEE 10th International Conference on Rehabilitation Robotics, Jun. 12-15, Noordwijk, The Netherlands, Jun. 12-15, 2007, Paper 7 pages, Abstract 1 page, Table of Contents 10 pages, and Halmstad University Post—Print 1 page, Total of 19 pages.

Jonas Johanssen, Daniel Petersson, Torque Sensor Free Power Assisted Wheelchair, Master's Thesis in Electrical Engineering, School of Information Science, Computer and Electrical Engineering, Halmstad University, Technical report, IDE0703, Jan. 2007, 78 pages.

Sehoon Oh, Yoichi Hori, Sensor Free Power Assisting Control Based on Velocity Control and Disturbance Observer, IEEE ISIE 2005, Jun. 20-23, 2005, Dubrovnik, Croatia, 6 pages.

Takashi Miyazawa, Seiichirou Katsura, Kouhei Ohnishi, A Power-Assisted Wheelchair Taking Running Environment Into Account, Copyright 2003 IEEE, 6 pages.

Rick N. Robertson, PhD, Michael L. Boninger, MD, Rory A. Cooper, PhD, Sean D. Shimada, MS, Pushrim Forces and Joint Kinetics During Wheelchair Propulsion, Arch Phys Med Rehabil vol. 77, Sep. 1996, 9 pages.

European Patent Office, Extended European Search Report, Application No. 12807785.6-1651, Dated: Jun. 10, 2015, 10 pages.

* cited by examiner

MOTION-BASED POWER ASSIST SYSTEM FOR WHEELCHAIRS

This application is a continuation of U.S. patent application Ser. No. 17/342,104, which is a continuation of U.S. patent application Ser. No. 15/218,937, filed on Jul. 25, 2016, which is a continuation of U.S. patent application Ser. No. 13/543,598, filed Jul. 6, 5 2012, which claims benefit of and priority to U.S. Provisional Application No. 61/504,949, filed Jul. 6, 2011, by Mark Richter, and is entitled to those filing dates for priority. The specifications, figures and complete disclosures of U.S. Provisional Application No. 61/504,949, U.S. patent application Ser. No. 13/543,598, U.S. patent application Ser. No. 15/218,937, and U.S. patent application Ser. No. 17/342,104 are incorporated herein in their entireties by specific reference for all purposes.

FIELD OF INVENTION

This invention relates to a power assist system for manual wheelchairs, specifically a system that employs motion-based sensing for recognition of user propulsion and braking.

BACKGROUND OF THE INVENTION

Manual wheelchairs are the primary mode of locomotion for millions of people around the world. Upper limb pain and injury is very common among these manual wheelchair users and can severely impact mobility, independence and quality of life. The most common types of injury are impingement syndrome of the shoulder and carpal tunnel syndrome of the wrist. Upper limb pain and injury is an emotionally, physically and financially costly problem.

Wheelchair propulsion is one activity that has been associated with the development of these upper extremity injuries. It is recommended that users reduce how hard they push on the handrim and to do it less frequently in order to reduce the stresses of propulsion on the upper body.

Prior art presents power attachment units that have been used to mount to manual wheelchairs to assist in propulsion. The typical power add-on, comparable to that disclosed in U.S. Pat. No. 4,759,418, which is incorporated herein by specific reference for all purposes, employs a linkage system that mounts to the wheelchair frame and trails in between the two rear wheels. An electric motor powers a drive wheel that is controlled by a push button located within reach of the user. This type of design, not common to all power attachments, also employs a steering bar that attaches to the front casters in order to guide the wheelchair when being driven by the power add-on. These electric drive attachments are known to be successful in helping to reduce the physical effort needed for propulsion. A drawback is that these types of systems completely eliminate the need for pushing because the user drives the wheelchair, rather than maneuvers it through pushes. In this situation, the user does not benefit from the physical exercise of manual propulsion or the psychological benefits of not being dependent on the device for transportation.

Another prior art is the push activated power assist wheels. These combine the benefits of manual push operation by the user and power assistance to reduce the demand on the user's upper extremities during propulsion. Push activated power assist wheels, similar to those disclosed in U.S. Pat. No. 5,818,189, which is incorporated herein by specific reference for all purposes, are battery powered wheels that employ either force and torque sensors, or both, to measure the force applied to the handrims from the user and amplify that force through the use of motors embedded in the wheels to drive the wheelchair forward or backward. This technology has been shown to have a number of positive effects on wheelchair users, including reduced energy expenditure, reduced push cadence, reduced muscle activation, decreased range of motion, easier hill climbing, increased propulsion speed and reduced pain during propulsion for those users already experiencing pain.

The drawback with this approach is that the employment of force and torque sensors to recognize and quantify the amplitude of the push significantly complicates the design. The handrims must be mounted to the wheel hubs, instead of the wheel rim as in typical manual wheelchairs, causing a significant increase in complexity. Added cost and weight of these devices then becomes inherent when this type of approach is taken. Additionally, because measurements are focused on the handrim, hazardous situations can be escalated by the assistive power.

Accordingly, there is a need for power assist system that addresses the issues of the prior art and devices.

SUMMARY OF INVENTION

In various exemplary embodiments, the present invention comprises a motion-based power assist system for manual wheelchairs. This power assist system uses the motion, including the angular and linear velocities and accelerations, of the power assist system in order to sense when a push is being performed on the handrims. The system uses different kinematic sensors, not force or torque sensors like the prior art, in order to measure when the wheelchair is accelerating past a certain minimal threshold, and recognizes that this is the result of the user performing a push. The system then provides an assistive force-pulse that is related to the experienced acceleration and velocity from propulsion.

By using the kinematics of the power assist system, the system will be able to recognize different situations and adjust its contribution to the user's propulsion to compensate. By measuring the kinematics of the power assist system, the present invention can recognize situations when the user is trying to stop, slow down, or is beginning to tip, and in response cut off all driving assistance. The use of the power assist system motion and kinematics as the input to the push activation control is novel. Prior art devices tend to add significant weight to the wheelchair, making it difficult to get the wheelchair into and out of a car for even the strongest user. Battery life is also an issue because the power assist wheels are simply too heavy to push around without the power assist.

In one exemplary embodiment of the invention, the aforementioned motion-based push activation is employed on a single drive wheel attachment that mounts to the axle of a wheelchair midway between the rear wheels. Attachment mounts are clamped to the axle and attach to the drive wheel attachment, allowing for quick connecting and releasing of the system for easy transport.

A separate embodiment employs the motion-based push activation on electric hub motors that are embedded in the rear drive wheels of a wheelchair. In using the motion of the wheelchair and its parts as the input for push activation, the handrims on the rear drive wheels can be directly mounted to the wheel rim, as on traditional non-power assist wheelchair wheels.

Another embodiment employs the said motion-based push activation on wheelchair mounted motors that drive the rear wheels of the wheelchair. This embodiment uses the same motion-based means to activate frame mounted motors, instead of the aforementioned wheel mounted motors, that in turn power the driven rear wheels for an assistive force to the wheelchair and user.

DETAILED DESCRIPTION OF EXEMPLARY EMBODIMENTS

In various exemplary embodiments, the present invention comprises a power assist system used on a manual wheelchair. Motion-based instrumentation measures the kinematics of the power assist system. The kinematics measured include, but are not limited to, linear velocities, angular velocities, linear accelerations, and angular accelerations. These parameters are quantified using a range of instruments, including but not limited to, gyroscopes, encoders, potentiometers, inertia measuring units, and multi-axis accelerometers. From these motion-based measurements, push activation can be recognized.

Figure 1:
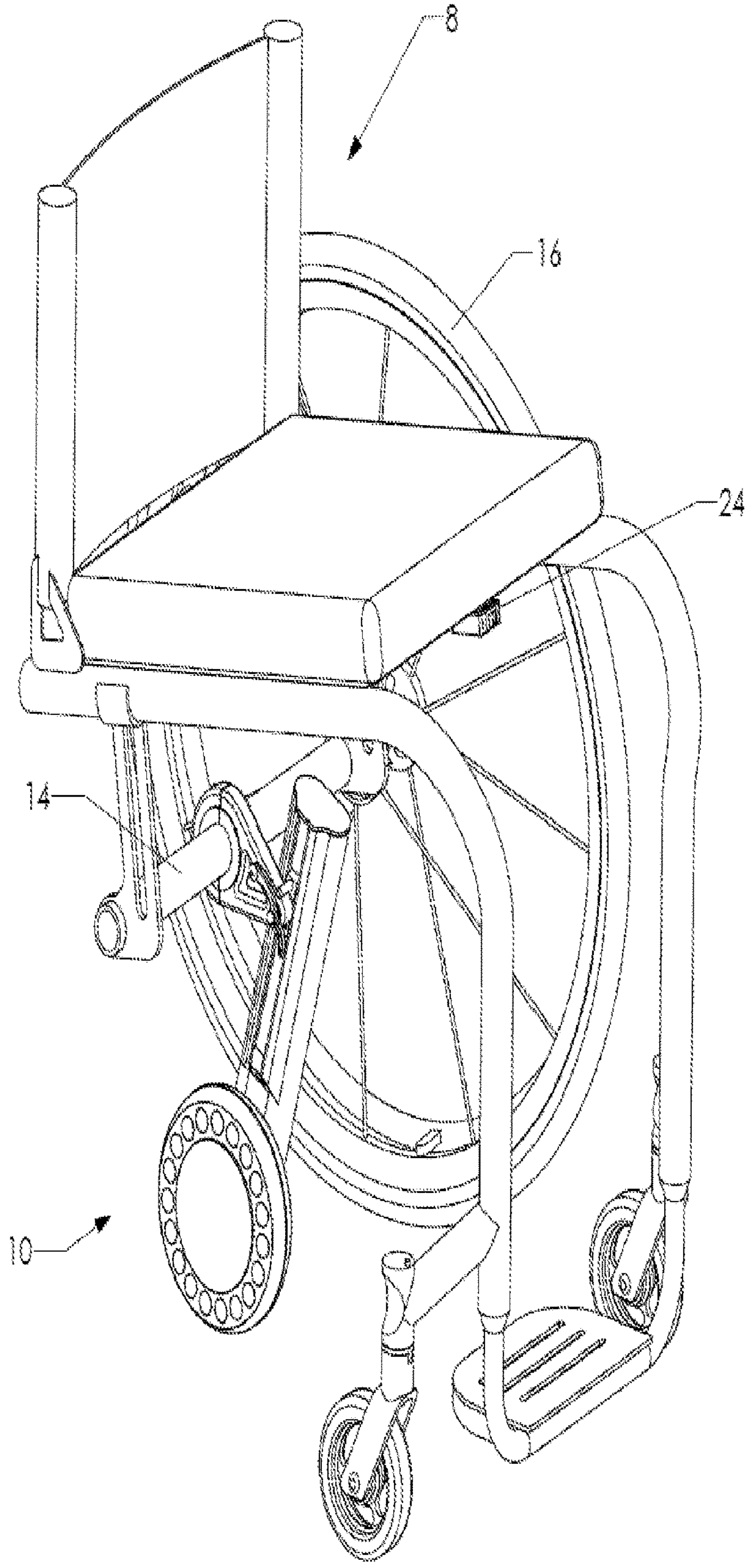
FIG. 1 shows an isometric view of an exemplary embodiment, a single drive wheel power assist attachment and remote control device mounted to a generic wheelchair. One of the rear wheels is removed for clarity.

The push activation recognition employs the principle that when the user is applying a push to the rim mounted handrim of typical wheelchair rear wheels 16 on a generic manual wheelchair 8, as shown in FIG. 1, the wheelchair rear wheels 16 are being accelerated by the user. If the rear wheels 16 are experiencing an angular acceleration then the wheelchair 8 and all onboard parts will experience acceleration. Because the wheelchair is accelerating, the power assist which is connected to it will also accelerate. If the power assist acceleration measurements are found to be above a threshold of approximately 1.5 m/s/s, a user push will be recognized. Similarly, if the power assist deceleration measurements are found to be below a threshold of approximately 1.5 m/s/s, a user brake will be recognized. The push recognition triggers the activation of an assistive power-pulse to help in the propulsion of the wheelchair 8 and the user that is performing the push. The power assist provided will be related to the manual power input as calculated from the motion-based sensors. In one approach, the power assist drive is set to the speed reached during the user's push. When user braking is detected, the provided power is discontinued.

Figure 2:
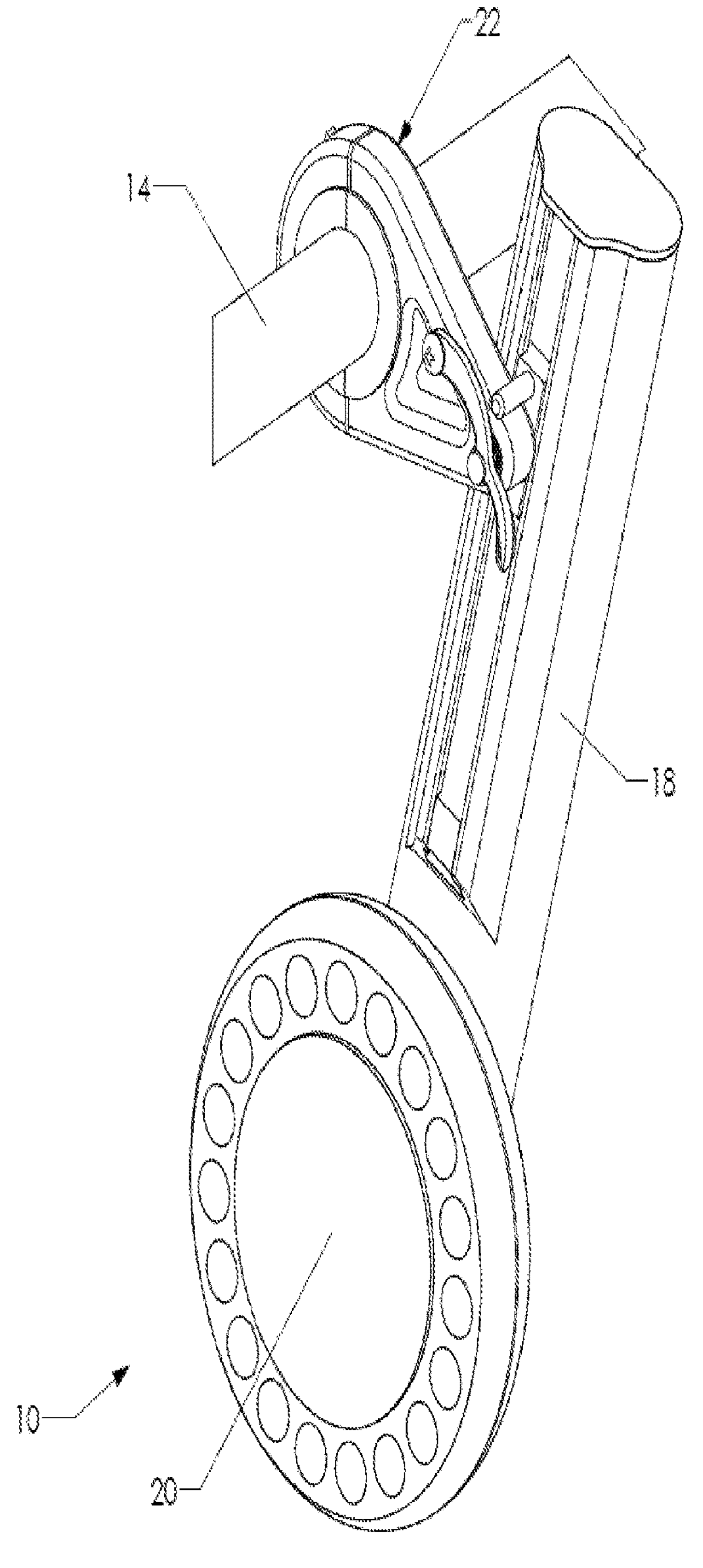
FIG. 2 shows an enlarged view of the single drive wheel power assist attachment of FIG. 1 mounted to the axle bar of a wheelchair frame.

FIGS. 1 and 2 show an embodiment of the power assist system employing the motion-based push activation. The power assist system, which in this embodiment comprises a single wheel power assist attachment 10, is shown mounted on a generic wheelchair 8, comprising a drive linkage 18, an electric hub drive wheel 20, a mounting attachment 22, and a remote control device 24.

The single wheel power assist attachment 10 is positioned between the wheelchair drive wheels 16 such that the electric drive wheel 20 contacts the ground at a point midway between the wheelchair drive wheels 16. This positioning prevents the wheelchair from turning or drifting when an assistive force is provided, while not significantly hindering the rotation of the chair when desired for maneuvering. The single wheel power assist attachment 10 and drive linkage 18 are also angled such that as the drive wheel power is increased, the wheel digs into the ground for ideal traction control.

The electric drive wheel 20 mounts to the distal end of the drive linkage 18, which is pivotally attached to the wheelchair axle bar 14 through the mounting attachment 22. While FIG. 1 and FIG. 2 show an embodiment with a singular mount attachment 22, in other embodiments a plurality or multitude of mounting attachments may be used to connect to the drive linkage 18. A remote control device 24 comprises part of the single wheel power assist attachment 10 to turn the unit on and modulate between multiple configuration settings for providing different amounts of driving force related to the sensed acceleration of the power assist system from the push of the user.

Figure 3:
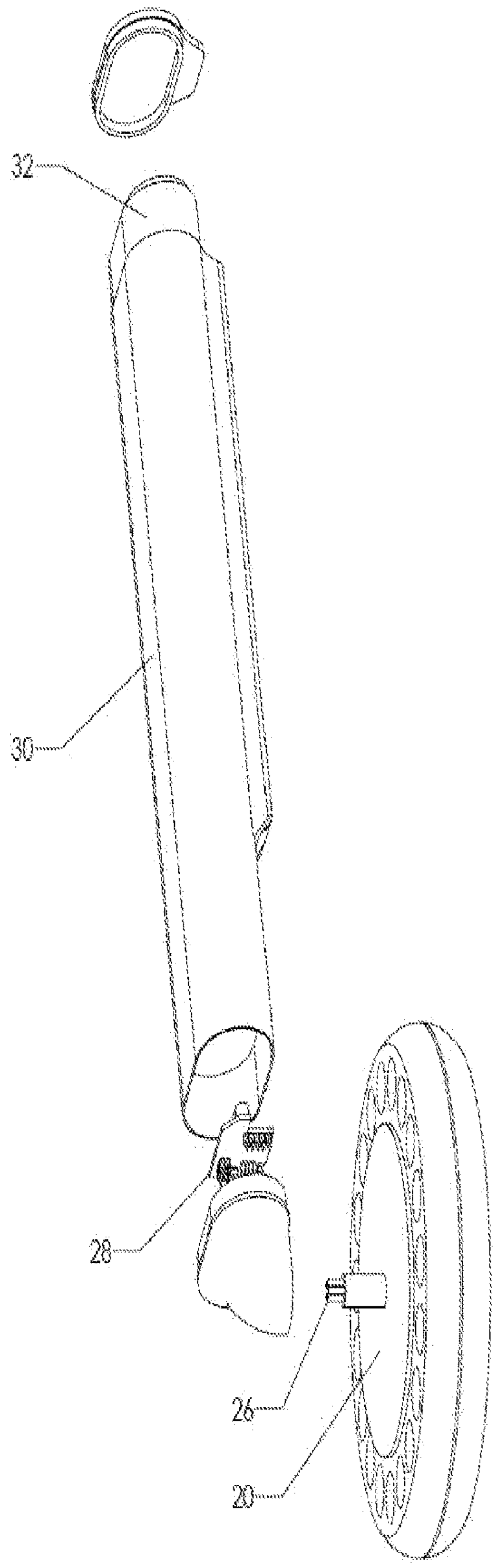
FIG. 3 shows an exploded assembly view of the single drive wheel power assist attachment of FIG. 1 removed from the wheelchair.

An exploded assembly of the power assist attachment 10 is shown in FIG. 3. The drive linkage 18 contains a shell or frame 30, a battery pack 32, custom printed circuit board 28, and electric hub motor 20. The primary role of the custom circuit board 28 is to receive sensor measurements, process those measurements to determine whether the users is pushing or braking, and then deliver the appropriate amount of power from the battery to the motor 20. Motion sensors can include inertial measurement units (gyroscopes, accelerometers and magnetometers) on the custom printed circuit board 28, rotational position sensors (optical encoders, Hall Effect sensors, or reed switches) in the drive motor 20, or inertial measurement units on the remote control device 24. Determining the linear acceleration of the wheelchair can be accomplished using several of these sensing modalities individually or with increased fidelity when done in combination to filter out any undesired motion artifacts, such as rolling over bumps or down slopes. The simplest method to derive linear acceleration of the wheelchair is to frequently sample the rotational position of the drive wheel 20 and differentiate discrete samples to derive the rotational speed and then differentiate rotational speed values to determine the rotational acceleration of the wheel. The linear acceleration of the wheelchair is directly related to the rotational acceleration of the drive wheel 20. Accelerations that occur when the power assist components are experiencing rapid changes in attitude (uphill/downhill angle) or vertical acceleration can be ignored as artifacts of environmental factors and not related to the user pushing or braking the wheelchair.

Sensor measurements and motor power is passed to and from the printed circuit board 28 by cables that pass though the motor axle 26. Sensor measurements and configuration information from the remote control device 24 is passed to the printed circuit board 28 wirelessly using any of a number of standard data transmission protocols.

Figure 4:
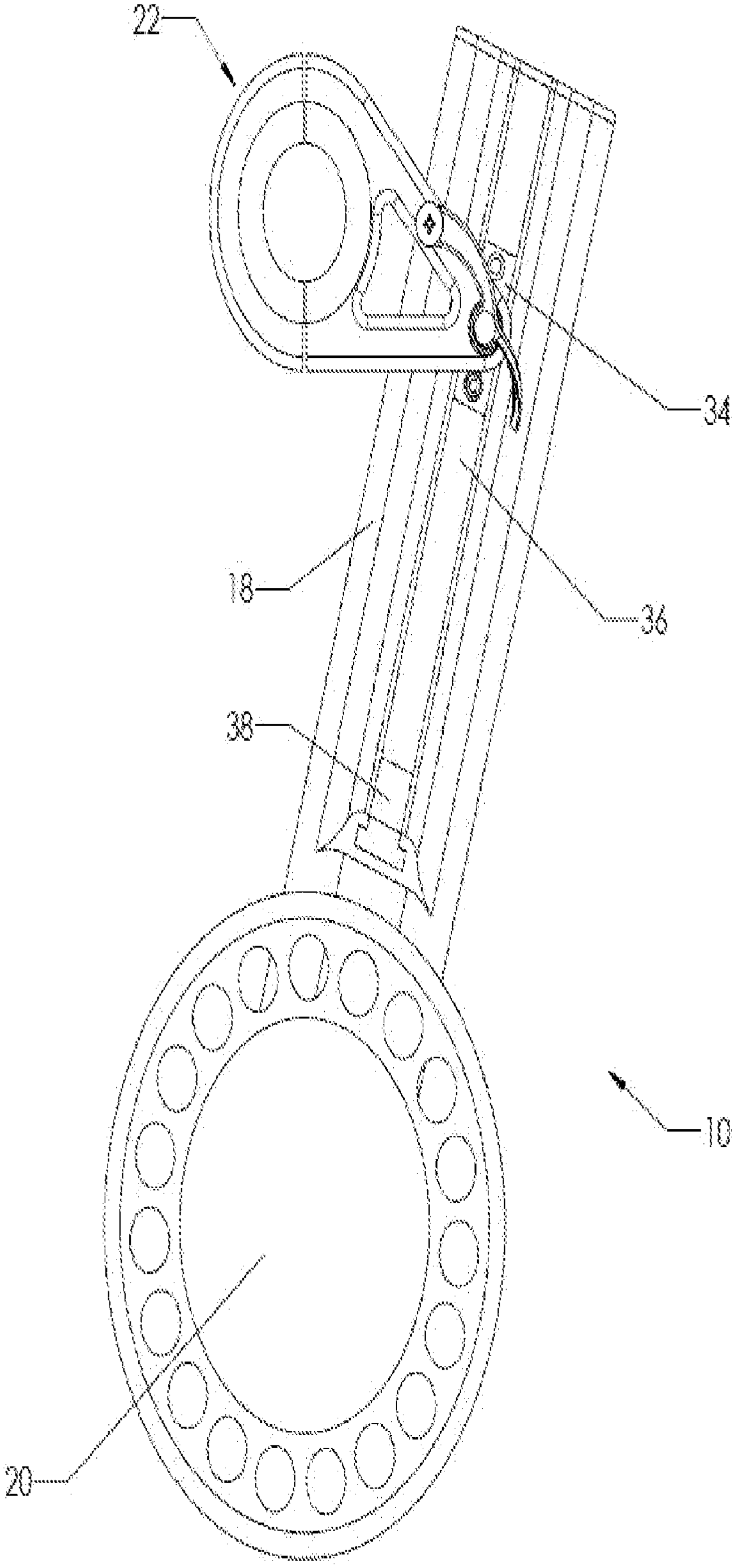
FIG. 4 shows an enlarged view of the single drive wheel power assist attachment of FIG. 1 mounted to the axle bar clamp, with the wheelchair removed for clarity.

The power assist unit 10 can be made to accommodate wheelchairs of varying rear wheel sizes by allowing the linkage pivot point to be adjusted along a slide pocket 36 in the drive linkage frame 30, as shown in FIG. 4. The pivot location can then be fixed by tightening machine screws in the pivot slider 34. The slide range can be limited using a stop in the slide track 38.

Figure 5:
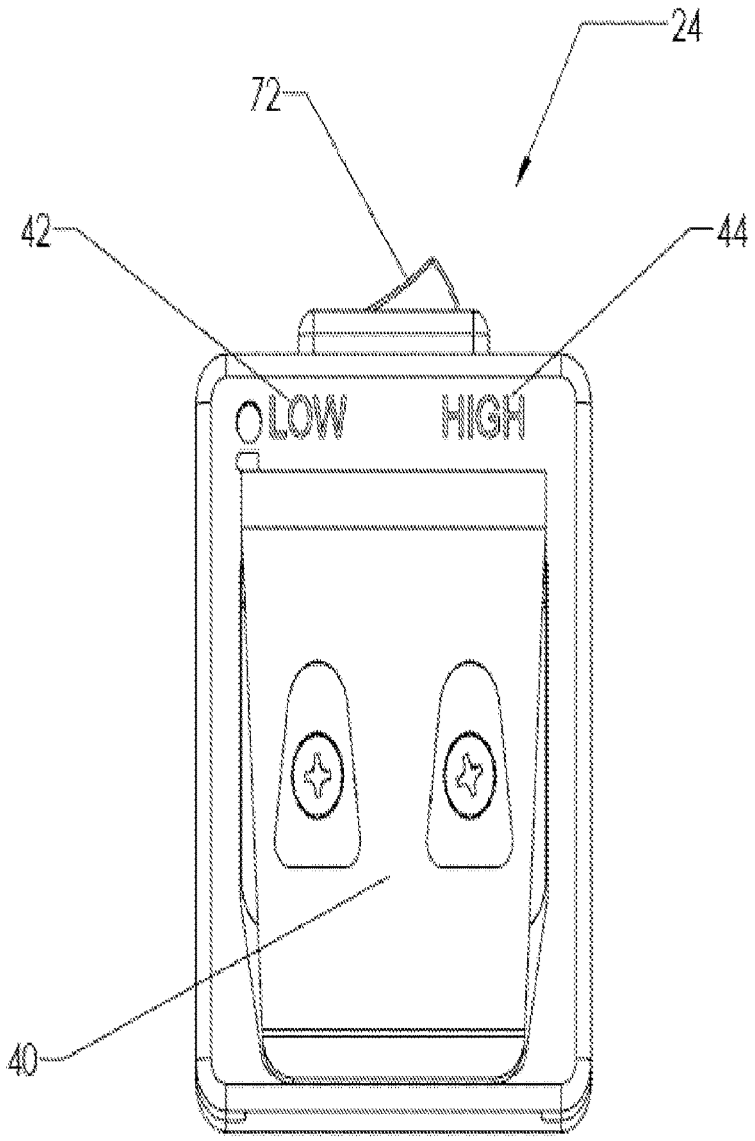
FIG. 5 shows the remote control device of FIG. 1 unclipped from the wheelchair seat upholstery.

The remote control device 24, shown removed from the wheelchair in FIG. 5, can be made to slide onto the seat upholstery using a simple spring clip 40. In this embodiment, it can be quickly installed onto a wheelchair without the use of tools and it can be easily removed when the power assist is not needed. The remote can be used to turn the unit on using a button or switch 72. Another use for the remote is to allow the user to select between various modes of operation, such as LOW 42 and HIGH 44. Low and high modes can serve to decrease or increase the level of power delivered to the motor for any applied push. This can be accomplished by altering the multiplier used in setting the motor power in response to a measured acceleration. In an alternate approach, low and high modes could be used to limit the maximum drive speed of the motor for indoor and outdoor use.

In another exemplary embodiment, motion-based push activation is used on two wheel hub motors incorporated into each of the wheelchair drive wheels. The design and operation of hub motors is well-known in the prior art. The motor assembly comprises a self-contained unit which includes a center shaft that fixable mounts the wheelchair to a stator. The motor housing has permanently mounted magnets and is rotationally driven by the push and pulling forces induced by the electrical excitation of the stator. The rotationally driven motor housing is connected to the tire supporting rim of the wheelchair wheel. The nature of this power assist system allows for the handrims to be directly mounted to the rim of the wheelchair drive wheels. As the user performs a push to the handrims, the wheelchair accelerates, activating the power assist through the motion-based recognition instrumentation.

The instrumentation and motion control processing is similar to the previously described embodiment. The primary difference is that the rotational position of the two rear wheels would be measured directly and averaged to yield a single rotational position, which would then be processed as previously described. Each rear wheel would communicate wirelessly with the other in order to exchange rotational position information. Each drive wheel would be set to the same drive speed setting at the same time. Similarly, power to each drive wheel would be discontinued at the same time when a braking event is detected.

In another embodiment, motion-based push activation is incorporated into a wheelchair frame fixed drive system. The wheelchair wheels are secured to the wheelchair as normally done. Drive motors are then affixed to the frame of the wheelchair and the output shafts are pressed into the rear wheel tires to effectively couple their rotations together. When a user pushes, the rear wheels along with the drive motor shafts accelerate and a push is recognized using the aforementioned sensing. The motor power is mechanically transferred to the rear wheels providing propulsion assistance. The mechanical means of transferring rotation from the drive motor to the rear wheels includes but is not limited to friction, gears, or belts, all of which is operationally well-known and need not be explained.

The foregoing description is that of certain exemplary embodiments, and various changes and adaptations can be made without departing from the scope of the invention. Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive.

What is claimed is:

1. A power assist system for a wheelchair, comprising:
a drive system including:
a drive linkage that includes an electric drive wheel; and
a mounting assembly connected to the drive linkage,
wherein the mounting assembly is configured to removably attach to a bar connected to the wheelchair, the bar being located between two drive wheels of the wheelchair, the bar being oriented parallel to an axis of rotation of the drive wheels, and
wherein in response to the mounting assembly being attached to the bar, the drive linkage is configured to pivot relative to the bar, the drive linkage extends downward from the mounting assembly so that the drive wheel makes contact with the ground at a position behind the mounting assembly.

2. The power assist system of claim 1, wherein the electric drive wheel is an electric hub drive wheel.

3. The power assist system of claim 1, wherein the mounting assembly is configured to attach to the bar between the two drive wheels of the wheelchair.

4. The power assist system of claim 1, wherein the mounting assembly includes at least one mounting attachment member configured to connect to the bar.

5. The power assist system of claim 1, further comprising a remote control that is configured to control the motor power of the electric drive wheel.

6. The power assist system of claim 5, wherein the remote control is configured to removably attach to the wheelchair.

7. The power assist system of claim 5, wherein the remote control can be clipped to the wheelchair.

8. The power assist system of claim 1, wherein the drive system is mounted to a wheelchair such that the electric hub drive wheel contacts the ground midway between the wheelchair drive wheels.

9. The power assist system of claim 1, wherein the bar is an axle of the wheelchair.

10. The power assist system of claim 1, wherein the mounting assembly is configured to attach to the bar at a location generally midway between the two drive wheels.

11. The power assist system of claim 1, wherein the linkage contains a battery pack and a printed circuit board.

12. A power assist system for a wheelchair comprising:
a drive system including:
a drive linkage;
an electric drive wheel operably connected to the drive linkage; and
a mounting assembly connected to the drive linkage,
wherein the mounting assembly is configured to removably attach to a bar connected to the wheelchair, the bar being located between a first drive wheel and a second drive wheel of the wheelchair, the bar being oriented parallel to an axis of rotation of the first drive wheel, and the mounting assembly is attached on the bar between the first drive wheel and the second drive wheel,
wherein in response to the mounting assembly being attached to the bar, the drive linkage extends downward from the mounting assembly so that the drive wheel makes contact with the ground at a position behind the mounting assembly.

13. The power assist system of claim 12, wherein in response to the mounting assembly being attached to the bar, the drive linkage is configured to pivot relative to the bar.

14. The power assist system of claim 12, wherein the bar is an axle of the wheelchair.

15. The power assist system of claim 12, wherein the linkage contains a battery pack.

16. The power assist system of claim 12, wherein the bar is extending between opposing side members of the wheelchair.

17. The power assist system of claim 12, further comprising a remote control that is configured to control the motor power of the electric drive wheel, the remote control is configured to removably attach to the wheelchair.

18. The power assist system of claim 12, wherein the mounting assembly is configured to attach to the bar at a position generally midway between the first drive wheel and the second drive wheel.

19. A power assist system for a wheelchair comprising:

a drive system including:

a drive linkage;

an electric hub drive wheel operably connected to the drive linkage; and a mounting assembly connected to the drive linkage, wherein the mounting assembly is configured to removably attach to a bar connected to the wheelchair, the bar being connected to the wheelchair by a plurality of connections, the bar located between a first drive wheel and a second drive wheel of the wheelchair, the bar being oriented parallel to an axis of rotation of at least the first drive wheel, and wherein in response to the mounting assembly being attached to the bar, the drive linkage is configured to pivot relative to the bar, the drive linkage extends downward from the mounting assembly so that the drive wheel makes contact with the ground at a position behind the mounting assembly.

20. The power assist system of claim 19, wherein the mounting assembly is configured to removably attach to the bar at a position generally midway between the two drive wheels.

* * * * *